US011009072B2

(12) United States Patent
Kimura et al.

(10) Patent No.: US 11,009,072 B2
(45) Date of Patent: May 18, 2021

(54) SLIDING COMPONENT

(71) Applicant: EAGLE INDUSTRY CO., LTD., Tokyo (JP)

(72) Inventors: Wataru Kimura, Tokyo (JP); Yuichiro Tokunaga, Tokyo (JP); Yuta Negishi, Tokyo (JP); Takeshi Hosoe, Tokyo (JP); Hideyuki Inoue, Tokyo (JP); Tetsuya Iguchi, Tokyo (JP)

(73) Assignee: EAGLE INDUSTRY CO., LTD, Tokyo (JP)

( * ) Notice: Subject to any disclaimer, the term of this patent is extended or adjusted under 35 U.S.C. 154(b) by 0 days.

(21) Appl. No.: 16/480,278

(22) PCT Filed: Jan. 15, 2018

(86) PCT No.: PCT/JP2018/000776
§ 371 (c)(1),
(2) Date: Jul. 23, 2019

(87) PCT Pub. No.: WO2018/139231
PCT Pub. Date: Aug. 2, 2018

(65) Prior Publication Data
US 2019/0376558 A1 Dec. 12, 2019

(30) Foreign Application Priority Data
Jan. 30, 2017 (JP) .............................. JP2017-014711

(51) Int. Cl.
*F16J 15/34* (2006.01)
*F16C 33/10* (2006.01)
*F16J 15/40* (2006.01)

(52) U.S. Cl.
CPC ........... *F16C 33/10* (2013.01); *F16J 15/3404* (2013.01); *F16J 15/40* (2013.01)

(58) Field of Classification Search
CPC ...... F16J 15/34; F16J 15/3404; F16J 15/3408; F16J 15/3412; F16J 15/3424; F16J 15/40; F16C 33/10
See application file for complete search history.

(56) References Cited

U.S. PATENT DOCUMENTS

2015/0184752 A1 7/2015 Itadani
2015/0226334 A1* 8/2015 Itadani ................. F16J 15/3424
277/400

(Continued)

FOREIGN PATENT DOCUMENTS

JP S6231775 A 2/1987
JP S62117360 U 7/1987

(Continued)

OTHER PUBLICATIONS

International Search Report (ISR) dated Apr. 3, 2018, issued for International application No. PCT/JP2018/000776. (1 page).

*Primary Examiner* — Gilbert Y Lee
(74) *Attorney, Agent, or Firm* — Law Office of Katsuhiro Arai

(57) ABSTRACT

In an exemplary embodiment, a sliding component includes a pair of sliding parts 4 and 7 sliding relatively to each other and having sliding faces S formed radially for sealing a liquid or a misty fluid as a sealed fluid against leakage. One sliding part is a stationary-side seal ring 7, and the other sliding part is a rotating-side seal ring 4. At least one of the sliding faces S is provided with positive pressure generation mechanisms 11 having positive pressure generation grooves 12 configured to communicate with a circumferential edge of the sliding face S on the sealed-fluid side and not to communicate with a circumferential edge on the leakage side, and discharge grooves 10 disposed at an angle such that (Continued)

upstream ends are located on the leakage side and downstream ends are located on the sealed-fluid side.

14 Claims, 7 Drawing Sheets

(56) References Cited

U.S. PATENT DOCUMENTS

| | | | |
|---|---|---|---|
| 2018/0073394 A1* | 3/2018 | Tokunaga | ............... F01D 25/16 |
| 2018/0135699 A1 | 5/2018 | Tokunaga et al. | |
| 2018/0172162 A1 | 6/2018 | Tokunaga et al. | |

FOREIGN PATENT DOCUMENTS

| | | |
|---|---|---|
| JP | 2001012610 A | 1/2001 |
| WO | 2014103631 A1 | 7/2014 |
| WO | 2016186015 A1 | 11/2016 |
| WO | 2016203878 A1 | 12/2016 |

* cited by examiner

SLIDING COMPONENT

CROSS-REFERENCE TO RELATED APPLICATIONS

This application is the U.S. National Phase under 35 U.S.C. § 371 of International Application PCT/JP2018/000776, filed Jan. 15, 2018, which claims priority to Japanese Patent Application No. 2017-014711, filed Jan. 30, 2017. The International Application was published under PCT Article 21(2) in a language other than English.

TECHNICAL FIELD

The present invention relates to sliding components suitable, for example, for mechanical seals, bearings, and other sliding units. In particular, the present invention relates to sliding components such as seal rings that require reduction of friction by intervention of fluid between sliding faces as well as prevention of leakage of fluid from the sliding faces, for example, oil seals used in gearboxes for turbochargers or for aircraft engines, or bearings.

BACKGROUND ART

Mechanical seals, which are an example of sliding components, are evaluated for their performance based on the leakage rate, the wear rate, and torque. Conventional arts have optimized the sliding material and the sliding face roughness of mechanical seals, thereby enhancing performance and achieving low leakage, long life, and low torque. However, due to growing awareness of environmental problems in recent years, a further improvement in the performance of mechanical seals has been required, and technical development beyond the limits of the conventional arts has been necessary.

Under such circumstances, as one used in an oil seal device of a rotating component such as a turbocharger, for example, known is one including a rotating shaft rotatably accommodated in a housing, a disk-shaped rotating body that rotates with the rotating shaft, and a disk-shaped stationary body that is fixed to the housing, and is brought into contact with an end face of the rotating body to prevent leakage of oil from the outer peripheral side to the inner peripheral side, in which an annular groove for generating positive pressure by the centrifugal force of fluid is provided on a contacting face of the stationary body to prevent leakage of oil from the outer peripheral side to the inner peripheral side (see Patent Document 1, for example).

Also known is one in a shaft seal device of a rotating shaft for sealing a toxic fluid, for example, including a rotating ring together with the rotating shaft and a stationary ring mounted to a casing, in which spiral grooves that draw in liquid on the low-pressure side toward the high-pressure side by the rotation of the rotating ring are provided on a sliding face of one of the rotating ring and the stationary ring, with their ends on the high-pressure side being of a dead-end shape, to prevent a sealed fluid on the high-pressure side from leaking to the low-pressure side (see Patent Document 2, for example).

Also, as a face seal structure suitable for sealing a drive shaft of a turbocharger against a compressor housing, for example, known is one with a pair of seal rings working together, in which one seal ring is provided at a rotating component, the other seal ring is provided at a stationary component, the seal rings have sealing faces formed substantially radially during operation, a seal gap is formed between the sealing faces for sealing an outside area on the sealing faces against an inside area on the sealing faces, a plurality of circumferentially spaced recesses effective for supplying gas is provided on at least one of the sealing faces, the recesses extend from one circumferential edge toward the other circumferential edge of the sealing face, and the inner ends of the recesses are provided at a radial distance from the other circumferential edge of the sealing face, so that a non-gas component in a gas medium containing the non-gas component is sealed (see Patent Document 3, for example).

CITATION LIST

Patent Documents

Patent Document 1: JP S62-117360 U
Patent Document 2: JP S62-31775 A
Patent Document 3: JP 2001-12610 A

SUMMARY OF THE INVENTION

Problem to be Solved by the Invention

The conventional arts disclosed in Patent Documents 1 to 3, however, have a problem that grooves such as spiral grooves provided on one of sliding faces of a pair of sliding parts sliding relatively concentrate the flow of fluid into the inside of the sliding faces, foreign matter such as abrasion powder and contaminants accumulate inside the sliding faces, causing wear on the sliding faces and leakage.

It is an object of the present invention to provide a sliding component capable of preventing wear on sliding faces and occurrence of leakage, in which a surface texture is provided on a sliding face of at least one of a pair of sliding parts sliding relatively, to actively introduce fluid to the sliding faces from startup to and during normal operation to improve lubrication performance, and to prevent accumulation of foreign matter such as abrasion powder and contaminants inside the sliding faces.

Means for Solving Problem

To attain the above object, a sliding component according to a first aspect of the present invention includes a pair of sliding parts sliding relatively to each other, one of the sliding parts being a stationary-side seal ring, the other of the sliding parts being a rotating-side seal ring, the seal rings having sliding faces formed radially for sealing a liquid or a misty fluid as a sealed fluid against leakage. The sliding component is characterized in that at least one of the sliding faces is provided with positive pressure generation mechanisms having positive pressure generation grooves configured to communicate with a circumferential edge of the sliding face on a sealed-fluid side and not to communicate with a circumferential edge on a leakage side, and discharge grooves disposed at an angle such that upstream ends are located on the leakage side and downstream ends are located on the sealed-fluid side.

According to this aspect, a fluid film between the sliding faces can be increased to improve the lubrication performance of the sliding faces, and foreign matter such as abrasion powder and contaminants present on the sliding faces can be discharged from the inside of the sliding faces to the sealed-fluid side, which can prevent wear on the sliding faces and occurrence of leakage.

According to a second aspect of the present invention, the sliding component in the first aspect is characterized in that the discharge grooves are of an outer peripheral discharge groove type with the upstream ends not connected to the leakage side and the downstream ends connected to the sealed-fluid side.

According to this aspect, the flow of fluid from the inside of the sliding faces can be formed to the outer peripheral side, ensuring the discharge of foreign matter from the inside of the sliding faces to the sealed-fluid side.

According to a third aspect of the present invention, the sliding component in the first aspect is characterized in that the discharge grooves are of an inner peripheral discharge groove type with the upstream ends connected to the leakage side and the downstream ends not connected to the sealed-fluid side.

According to this aspect, fluid on the leakage side can be actively pumped into the sliding faces, the flow of the fluid from the inner periphery to the sliding faces can be accelerated, and foreign matter such as abrasion powder and contaminants present on the sliding faces can be discharged to the outer peripheral side, using centrifugal force.

According to a fourth aspect of the present invention, the sliding component in the first aspect is characterized in that the discharge grooves are of the outer peripheral discharge groove type and of the inner peripheral discharge groove type.

According to this aspect, the discharge grooves of the inner peripheral discharge groove type can actively pump fluid on the leakage side into the sliding faces S, accelerating the flow of the fluid from the inner periphery to the sliding faces, and the discharge grooves of the outer peripheral discharge groove type can form the flow of fluid from the inside of the sliding faces to the outer peripheral side, thus further ensuring that foreign matter can be discharged from the inside of the sliding faces to the sealed-fluid side.

According to a fifth aspect of the present invention, the sliding component in any one of the first to fourth aspects is characterized in that the sliding face is provided with spiral grooves having upstream ends connected to the leakage side and downstream ends not connected to the circumferential edge on the sealed-fluid side, and disposed at an angle from upstream to downstream.

According to this aspect, the sliding faces can be brought into a gas lubrication state from the leakage side to the vicinities of the positive pressure generation mechanisms, having very low friction, and gas on the leakage side is pumped toward the sealed-fluid side, so that the sealed fluid can be prevented from leaking to the leakage side.

According to a sixth aspect of the present invention, the sliding component in the fifth aspect is characterized in that the discharge grooves have a groove depth deeper than the positive pressure generation grooves or the spiral grooves.

According to this aspect, the discharge of foreign matter such as abrasion powder and contaminants can be ensured, and negative pressure generation can be prevented to prevent the reduction of a floating force over the entire sliding face.

According to a seventh aspect of the present invention, the sliding component in the first aspect is characterized in that the positive pressure generation grooves are formed from grooves of Rayleigh step mechanisms.

According to this aspect, positive pressure (dynamic pressure) is generated even in a low-speed rotating state of the rotating-side seal ring such as at startup, so that a liquid film between the sliding faces at low speeds can be increased to improve the lubrication performance at low speeds.

According to an eighth aspect of the present invention, the sliding component in the seventh aspect is characterized in that the grooves have a downstream width or depth set smaller than an upstream width or depth.

According to this aspect, the effect of generating positive pressure can be enhanced.

According to a ninth aspect of the present invention, the sliding component in any one of the first to eighth aspects is characterized in that the sliding face has a land provided with dimples.

According to this aspect, fluid can be stored over the entire sliding face, and positive pressure can be generated between the sliding faces to enhance the lubrication performance of the sliding faces.

Effect of the Invention

The present invention achieves the following outstanding effects:

(1) At least one of the sliding faces is provided with the positive pressure generation mechanisms having the positive pressure generation grooves configured to communicate with the circumferential edge of the sliding face on the sealed-fluid side and not to communicate with the circumferential edge on the leakage side, and the discharge grooves disposed at an angle such that the upstream ends are located on the leakage side and the downstream ends are located on the sealed-fluid side. Consequently, a fluid film between the sliding faces can be increased to improve the lubrication performance of the sliding faces, and foreign matter such as abrasion powder and contaminants present on the sliding faces can be discharged from the inside of the sliding faces to the sealed-fluid side, which can prevent wear on the sliding faces and occurrence of leakage.

(2) The discharge grooves are of the outer peripheral discharge groove type with the upstream ends not connected to the leakage side and the downstream ends connected to the sealed-fluid side. Consequently, the flow of fluid from the inside of the sliding faces can be formed to the outer peripheral side, ensuring the discharge of foreign matter from the inside of the sliding faces to the sealed-fluid side.

(3) The discharge grooves are of the inner peripheral discharge groove type with the upstream ends connected to the leakage side and the downstream ends not connected to the sealed-fluid side. Consequently, fluid on the leakage side can be actively pumped into the sliding faces, the flow of the fluid from the inner periphery to the sliding faces is accelerated, and foreign matter such as abrasion powder and contaminants present on the sliding faces can be discharged to the outer peripheral side, using centrifugal force.

(4) The discharge grooves are of the outer peripheral discharge groove type and of the inner peripheral discharge groove type. Consequently, the discharge grooves of the inner peripheral discharge groove type can actively pump fluid on the leakage side into the sliding faces, accelerating the flow of the fluid from the inner periphery to the sliding faces, and the discharge grooves of the outer peripheral discharge groove type can form the flow of fluid from the inside of the sliding faces to the outer peripheral side, thus further ensuring that foreign matter can be discharged from the inside of the sliding faces to the sealed-fluid side.

(5) The sliding face is provided with the spiral grooves having the upstream ends connected to the leakage side and the downstream ends not connected to the circumferential edge on the sealed-fluid side, and disposed at an angle from upstream to downstream. Consequently, the sliding faces can be brought into a gas lubrication state from the leakage side to the vicinities of the positive pressure generation mechanisms, having very low friction, and gas on the leakage side is pumped toward the sealed-fluid side, so that the sealed fluid can be prevented from leaking to the leakage side.

(6) The discharge grooves have a groove depth deeper than the positive pressure generation grooves or the spiral grooves. Consequently, the discharge of foreign matter such as abrasion powder and contaminants can be ensured, and negative pressure generation can be prevented to prevent the reduction of a floating force over the entire sliding face.

(7) The positive pressure generation grooves are formed from grooves of Rayleigh step mechanisms. Consequently, positive pressure (dynamic pressure) is generated even in a low-speed rotating state of the rotating-side seal ring such as at startup, so that a liquid film between the sliding faces at low speeds can be increased to improve the lubrication performance at low speeds.

(8) The grooves have the downstream width or depth set smaller than the upstream width or depth, and thus can enhance the effect of generating positive pressure.

(9) The sliding face has the land provided with the dimples, and thus can store fluid over the entire sliding face, and can generate positive pressure between the sliding faces to enhance the lubrication performance of the sliding faces.

DESCRIPTION OF EMBODIMENTS

Hereinafter, with reference to the drawings, modes for carrying out this invention will be described illustratively based on embodiments. However, the dimensions, materials, shapes, relative arrangements, and others of components described in the embodiments are not intended to limit the scope of the present invention only to them unless otherwise described explicitly.

First Embodiment

Figure 1:
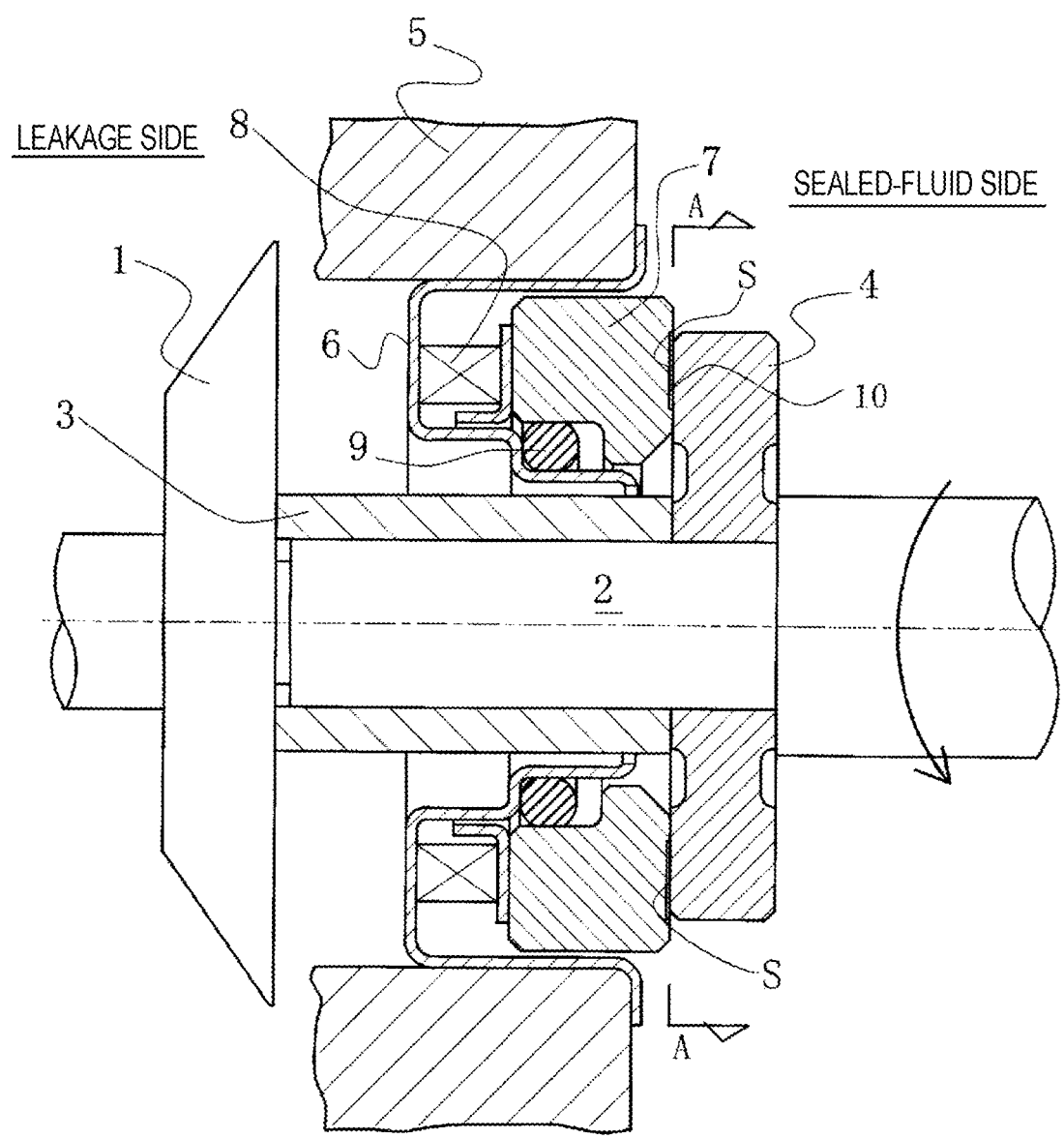
FIG. 1 is a vertical cross-sectional view showing an example of a mechanical seal according to a first embodiment of the present invention.
Figure 2:
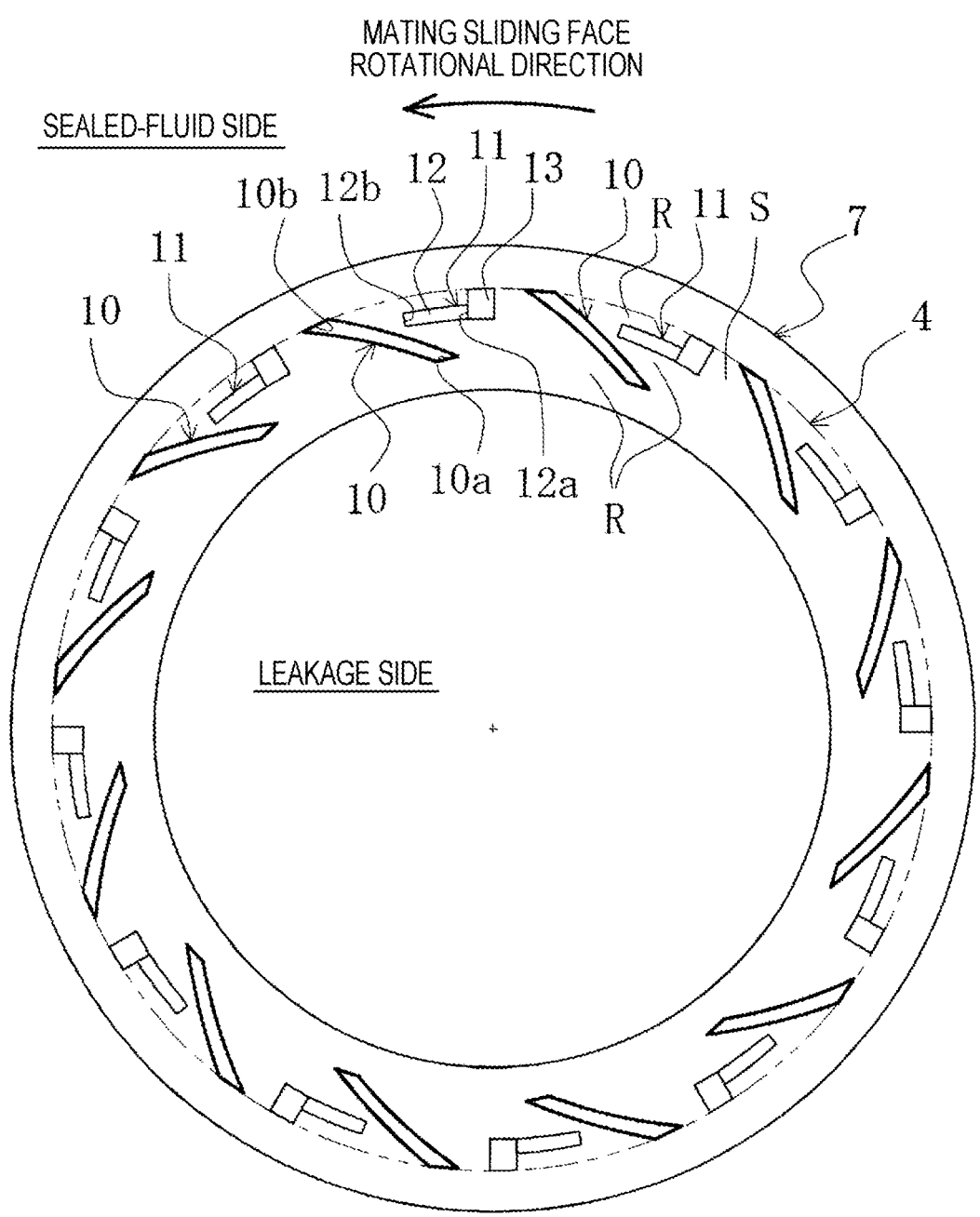
FIG. 2 shows a sliding face of a sliding part according to the first embodiment of the present invention, in which a surface texture (positive pressure generation mechanisms and discharge grooves) is provided on a sliding face of a stationary-side seal ring.

With reference to FIGS. 1 and 2, a sliding component according to a first embodiment of the present invention will be described.

Note that the embodiments below describe a mechanical seal, which is an example of the sliding component, as an example. The outer peripheral side of sliding parts constituting the mechanical seal is described as the sealed-fluid side (liquid side or misty-fluid side), and the inner peripheral side as the leakage side (gas side). However, the present invention is not limited to this, and is applicable to a case where the outer peripheral side is the leakage side (gas side), and the inner peripheral side is the sealed-fluid side (liquid side or misty-fluid side). As for the relationship in the magnitude of pressure between the sealed-fluid side (liquid side or misty-fluid side) and the leakage side (gas side), for example, the sealed-fluid side (liquid side or misty-fluid side) may be at high pressure, and the leakage side (gas side) at lower pressure, or vice versa. Alternatively, both sides may be at equal pressure.

FIG. 1 is a vertical cross-sectional view showing an example of a mechanical seal, which is an inside mechanical seal in the form of sealing a sealed fluid tending to leak from the outer periphery toward the inner periphery of sliding faces, such as lubricating oil used at a bearing. The mechanical seal is provided with an annular rotating-side seal ring 4 that is one sliding part provided via a sleeve 3 at a rotating shaft 2 that drives an impeller 1 of a compressor provided in a turbocharger, in a state of being integrally rotatable with the rotating shaft 2, and an annular stationary-side seal ring 7 that is the other sliding part provided at a housing 5 via a cartridge 6 in a non-rotating state and in an axially movable state. With a coiled wave spring 8 axially urging the stationary-side seal ring 7, the rotating-side seal ring 4 and the stationary-side seal ring 7 slide in close contact with each other at sliding faces S.

That is, in this mechanical seal, the rotating-side seal ring 4 and the stationary-side seal ring 7 have the sliding faces S formed radially, and prevent a sealed fluid, for example, a liquid or a misty fluid (hereinafter, sometimes referred to simply as a "liquid") from flowing out from the outer periphery of the sliding faces S to the leakage side on the inner peripheral side at each other's sliding faces S.

Reference numeral 9 denotes an O-ring, which seals a space between the cartridge 6 and the stationary-side seal ring 7.

The present example describes a case where the sleeve 3 is separate from the rotating-side seal ring 4, but the present invention is not limited thereto. The sleeve 3 may be formed integrally with the rotating-side seal ring 4.

Also, the present example shows a case where the outer diameter of the stationary-side seal ring 7 is larger than the outer diameter of the rotating-side seal ring 4, but the present invention is not limited thereto, and may be the opposite.

The material of the rotating-side seal ring 4 and the stationary-side seal ring 7 is selected from silicon carbide (SiC) excellent in wear resistance, carbon excellent in self-lubricity, and the like. For example, both may be SiC, or a combination of one being SiC and the other being carbon is possible.

FIG. 2 shows a sliding face S of a sliding part according to the first embodiment of the present invention. The present example describes a case where the sliding face S of the stationary-side seal ring 7 shown in FIG. 1 is provided with discharge grooves 10 and positive pressure generation mechanisms 11 which constitute a surface texture.

In the present example, the outer diameter of the stationary-side seal ring 7 is set larger than the outer diameter of the rotating-side seal ring 4. Thus, the discharge grooves 10 and the positive pressure generation mechanisms 11 do not need to be provided to the outer peripheral edge of the sliding face S of the stationary-side seal ring 7, and only need to be provided to the outer peripheral edge of the rotating-side seal ring 4 shown by a broken line.

In the present example, since the sliding face S of the stationary-side seal ring 7 is worked on to form the discharge grooves 10 and the positive pressure generation mechanisms 11, the stationary-side seal ring 7 is formed of carbon, and the rotating-side seal ring 4 is formed of silicon carbide (SiC).

In FIG. 2, the outer peripheral side of the sliding face S of the stationary-side seal ring 7 is the sealed-fluid side, e.g. the liquid side, and the inner peripheral side is the leakage side, e.g. the gas side. Assume that the mating sliding face rotates counterclockwise as shown by an arrow.

The sliding face S of the stationary-side seal ring 7 is provided with the positive pressure generation mechanisms 11 having positive pressure generation grooves 12 configured to communicate with the sealed-fluid side of the sliding face S, that is, the circumferential edge on the outer peripheral side, and not to communicate with the leakage side, that is, the circumferential edge on the inner peripheral side.

In the case of FIG. 2, the positive pressure generation mechanisms 11 are formed from Rayleigh step mechanisms, and the positive pressure generation grooves 12 are formed from grooves of the Rayleigh step mechanisms. Upstream ends 12a of the grooves 12 constituting the positive pressure generation grooves are connected to the sealed-fluid side by radius-direction deep grooves 13. The grooves 12 constitute Rayleigh steps at downstream ends 12b, and generate positive pressure at the Rayleigh steps. The generation of positive pressure increases a fluid film between the sliding faces, improving the lubrication performance of the sliding faces S. In particular, the positive pressure generation mechanisms 11 generate positive pressure (dynamic pressure) in a low-speed rotating state of the rotating-side seal ring 4 such as at startup, so that a liquid film between the sliding faces S at low speeds can be increased to improve the lubrication performance at low speeds.

It is effective to form the grooves 12 such that their downstream width or depth is smaller than their upstream width or depth to increase positive pressure generation.

In the present example, the positive pressure generation mechanisms 11, the number of which is twelve, are circumferentially evenly spaced. However, the number of the positive pressure generation mechanisms 11 may be one or more, and the positive pressure generation mechanisms 11 are not limited to be evenly spaced.

The sliding face S is also provided with the discharge grooves 10 disposed at an angle such that their upstream ends 10a are located on the leakage side and their downstream ends 10b are located on the sealed-fluid side.

The discharge grooves 10 have a constant width, extend radially, are provided at an angle to facilitate the flow of fluid from the upstream ends 10a to the downstream ends 10b by relative sliding, and are of a spiral shape or a rectangular shape, for example.

The groove depth of the discharge grooves 10 is set sufficiently deeper than the groove depth of the positive pressure generation grooves 12, and is set to about 25 μm to 500 μm, for example. This ensures the discharge of foreign matter such as abrasion powder and contaminants, prevents negative pressure generation, and does not reduce a floating force over the entire sliding face.

In the case of FIG. 2, the discharge grooves 10 are of an "outer peripheral discharge groove type" with the upstream ends 10a not connected to the leakage side and the downstream ends 10b connected to the sealed-fluid side.

The discharge grooves 10 are disposed in circumferential spaces between the positive pressure generation mechanisms 11, and their downstream ends 10b extend to the outer peripheral side beyond the positive pressure generation grooves 12, ensuring the discharge of fluid to the outer peripheral side.

The discharge grooves 10 cause foreign matter such as abrasion powder and contaminants present on the sliding faces S to be discharged from the inside of the sliding faces to the outside of the sliding faces to prevent wear on the sliding faces S.

The discharge grooves 10 of the outer peripheral discharge groove type shown in FIG. 2 have the function of accelerating the flow of fluid to the outer periphery to discharge foreign matter such as abrasion powder and contaminants present on the sliding faces S to the outer peripheral side, using centrifugal force.

A land R (which means a smooth portion of the sliding face not worked on to form grooves) of the sliding face S may be provided with a plurality of dimples not shown (grooves including circular grooves or the like) at an appropriate density. The dimples have the function of storing fluid inside, and the function of generating positive pressure between the sliding faces.

Now, when the impeller 1 of the compressor is driven, and the rotating-side seal ring 4 is rotated via the rotating shaft 2, positive pressure is generated at the positive pressure generation mechanisms 11 due to relative sliding between the sliding faces S, separating the sliding faces S slightly. The liquid on the outer peripheral side is introduced gradually into a space between the sliding faces S, and the sliding faces S are held in a noncontact state due to fluid lubricating action. At that time, on the sliding face S, a flow toward the outer periphery is accelerated from the upstream ends 10a of the discharge grooves 10 and their surroundings to the downstream ends 10b (the sealed-fluid side), and foreign matter such as abrasion powder and contaminants present on the sliding faces S is discharged from the inside of the sliding faces to the sealed-fluid side.

In the present example, in particular, the discharge grooves 10 are of the outer peripheral discharge groove type with the downstream ends 10b connected to the sealed-fluid side, and the downstream ends 10b extend to the outer peripheral side beyond the positive pressure generation grooves 12, so that the flow of fluid is formed to the outer peripheral side, ensuring that foreign matter can be discharged from the inside of the sliding faces to the sealed-fluid side.

The configuration of the first embodiment described above achieves the following effects:

(1) At least one of the sliding faces is provided with the positive pressure generation mechanisms 11 having the positive pressure generation grooves 12 configured to communicate with the circumferential edge of the sliding face on the sealed-fluid side and not to communicate with the circumferential edge on the leakage side, and the discharge grooves 10 disposed at an angle such that the upstream ends 10a are located on the leakage side and the downstream ends 10b are located on the sealed-fluid side. Consequently, a fluid film between the sliding faces S can be increased to improve the lubrication performance of the sliding faces S, and foreign matter such as abrasion powder and contaminants present on the sliding faces S can be discharged from the inside of the sliding faces to the sealed-fluid side, which can prevent wear on the sliding faces and occurrence of leakage.

(2) The discharge grooves 10 are of the outer peripheral discharge groove type with the upstream ends 10a not connected to the leakage side and the downstream ends 10b connected to the sealed-fluid side. Consequently, the flow of fluid from the inside of the sliding faces S can be formed to the outer peripheral side, ensuring the discharge of foreign matter from the inside of the sliding faces to the sealed-fluid side.

(3) The groove depth of the discharge grooves 10 is deeper than the groove depth of the positive pressure generation grooves 12, which can ensure the discharge of foreign matter such as abrasion powder and contaminants, and prevent negative pressure generation to prevent the reduction of a floating force over the entire sliding face.

(4) The positive pressure generation grooves are formed from grooves of Rayleigh step mechanisms, and thus generate positive pressure (dynamic pressure) even in a low-speed rotating state of the rotating-side seal ring 4 such as at startup. Consequently, a liquid film between the sliding faces S at low speeds can be increased to improve the lubrication performance at low speeds.

(5) The downstream width or depth of the grooves may be set smaller than the upstream width or depth, thereby enhancing the effect of generating positive pressure.

(6) The land of the sliding face may be provided with dimples, thereby storing fluid over the entire sliding face S and generating positive pressure between the sliding faces to enhance the lubrication performance of the sliding faces S.

Second Embodiment

Figure 3:
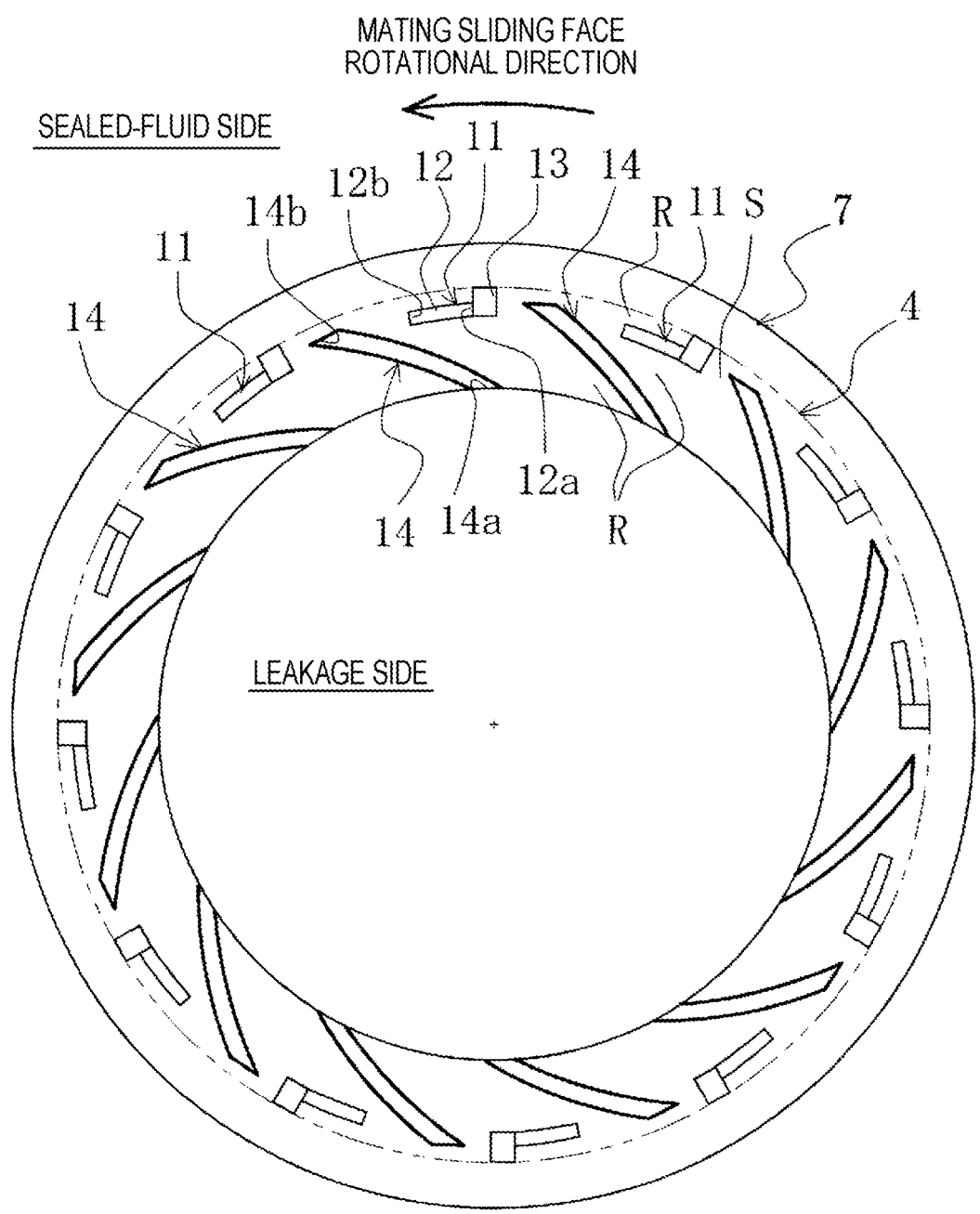
FIG. 3 shows a sliding face of a sliding part according to a second embodiment of the present invention, in which a surface texture (positive pressure generation mechanisms and discharge grooves) is provided on a sliding face of a stationary-side seal ring.

With reference to FIG. 3, a sliding part according to a second embodiment of the present invention will be described.

The sliding part according to the second embodiment is different from the sliding part of the first embodiment in that discharge grooves are of an inner peripheral discharge groove type. The other basic configuration thereof is identical to that of the first embodiment, and the same reference numeral is assigned to the same member as that in the first embodiment without duplicated explanation.

In FIG. 3, the sliding face S is provided with discharge grooves 14 disposed at an angle such that their upstream ends 14a are located on the leakage side and their downstream ends 14b are located on the sealed-fluid side.

The discharge grooves 14 have a constant width, extend radially, are provided at an angle to facilitate the flow of fluid from the upstream ends 14a to the downstream ends 14b by relative sliding, and are of a spiral shape or a rectangular shape, for example.

The groove depth of the discharge grooves 14 is set deeper than the groove depth of the positive pressure generation grooves 12.

In the case of FIG. 3, the discharge grooves 14 are of the "inner peripheral discharge groove type" with the upstream ends 14a connected to the leakage side, and the downstream ends 14b not connected to the sealed-fluid side.

The discharge grooves 14 are disposed in circumferential spaces between the positive pressure generation mechanisms 11, and their downstream ends 14b are set in positions to radially coincide with the positive pressure generation grooves 12.

The discharge grooves 14 of the inner peripheral discharge groove type shown in FIG. 3, whose upstream ends 14a are connected to the leakage side, can thus actively pump fluid on the leakage side into the sliding faces S, accelerating the flow of the fluid from the inner periphery to the sliding faces S, and can have the function of discharging foreign matter such as abrasion powder and contaminants present on the sliding faces S to the outer peripheral side, using centrifugal force.

Further, the discharge grooves 14, whose downstream ends 14b are set in positions to radially substantially coincide with the positive pressure generation grooves 12, can thus have the effect of generating positive pressure at or near the positive pressure generation grooves 12.

The configuration of the second embodiment described above achieves, in particular, the following effects:

(1) The discharge grooves 14, which are of the inner peripheral discharge groove type with the upstream ends 14a connected to the leakage side and the downstream ends 14b not connected to the sealed-fluid side, can thus actively pump fluid on the leakage side into the sliding faces S, accelerating the flow of the fluid from the inner periphery to the sliding faces S, and can discharge foreign matter such as abrasion powder and contaminants present on the sliding faces S to the outer peripheral side, using centrifugal force.

(2) The discharge grooves 14, whose downstream ends 14b are set in positions to radially substantially coincide with the positive pressure generation grooves 12, can thus generate positive pressure at or near the positive pressure generation grooves 12 in a superimposing manner.

Third Embodiment

Figure 4:
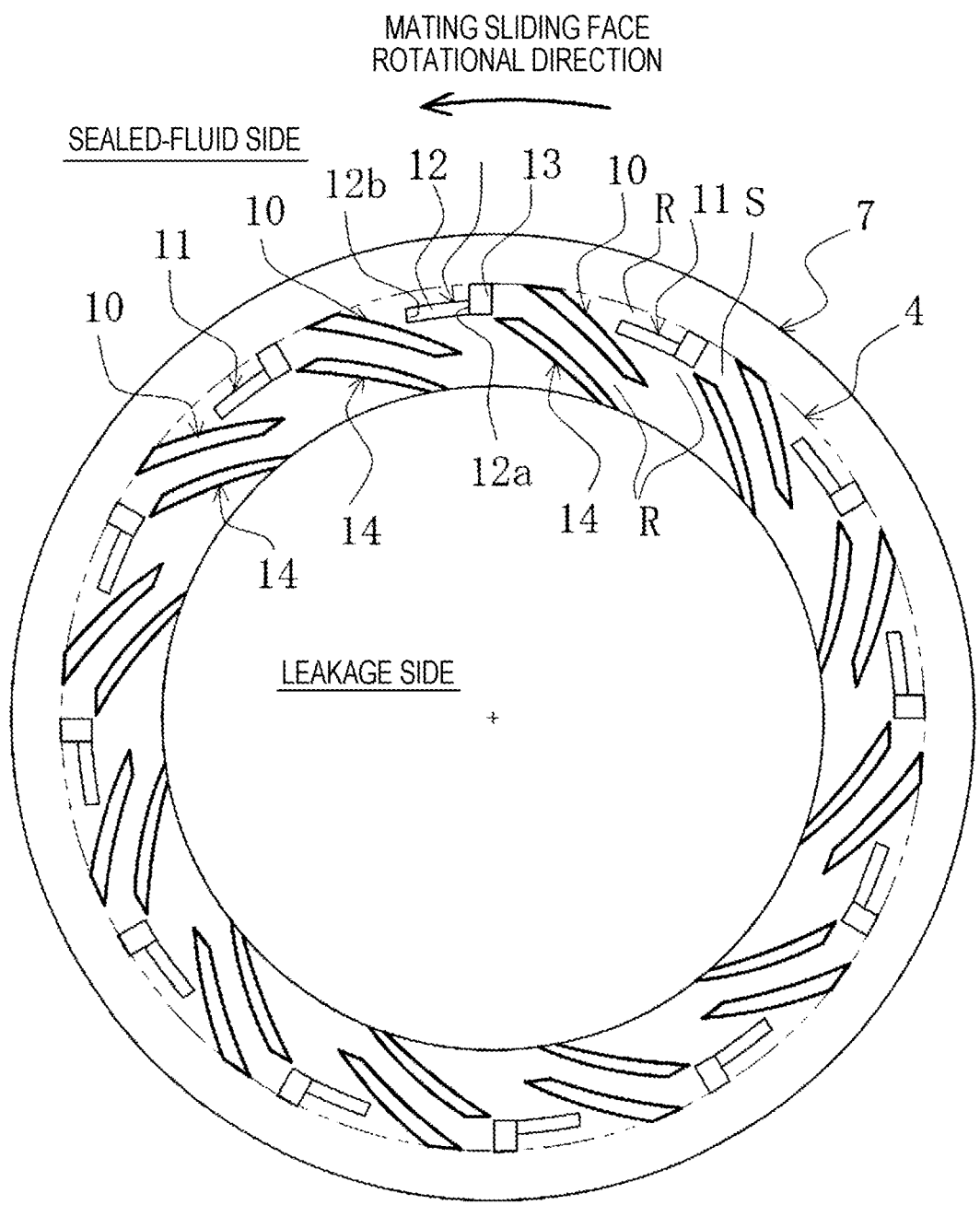
FIG. 4 shows a sliding face of a sliding part according to a third embodiment of the present invention, in which a surface texture (positive pressure generation mechanisms and discharge grooves) is provided on a sliding face of a stationary-side seal ring.

With reference to FIG. 4, a sliding part according to a third embodiment of the present invention will be described.

The sliding part according to the third embodiment is different from the sliding part of the first embodiment in that it includes as discharge grooves both those of the outer peripheral discharge groove type and those of the inner peripheral discharge groove type. The other basic configuration thereof is identical to that of the first embodiment, and the same reference numeral is assigned to the same member as that in the first embodiment without duplicated explanation.

In FIG. 4, the sliding face S is provided with both discharge grooves 10 of the outer peripheral discharge groove type and discharge grooves 14 of the inner peripheral discharge groove type.

In the case of FIG. 4, the discharge grooves 10 of the outer peripheral discharge groove type and the discharge 14 grooves of the inner peripheral discharge groove type, the numbers of which are each twelve, are evenly disposed in circumferential spaces between the positive pressure generation mechanisms 11, forming pairs, and the discharge grooves 10 of the outer peripheral discharge groove type are disposed in upstream positions, and the discharge grooves 14 of the inner peripheral discharge groove type in downstream positions, but the present invention is not limited thereto.

For example, the discharge grooves 14 of the inner peripheral discharge groove type may be disposed in upstream positions, and the discharge grooves 10 of the outer peripheral discharge groove type in downstream positions.

According to the configuration of the third embodiment described above, in particular, the discharge grooves 14 of the inner peripheral discharge groove type can actively pump fluid on the leakage side into the sliding faces S, accelerating the flow of the fluid from the inner periphery to the sliding faces S, and the discharge grooves 10 of the outer peripheral discharge groove type can form the flow of fluid from the inside of the sliding faces S to the outer peripheral side, thus further ensuring that foreign matter can be discharged from the inside of the sliding faces to the sealed-fluid side.

Fourth Embodiment

Figure 5:
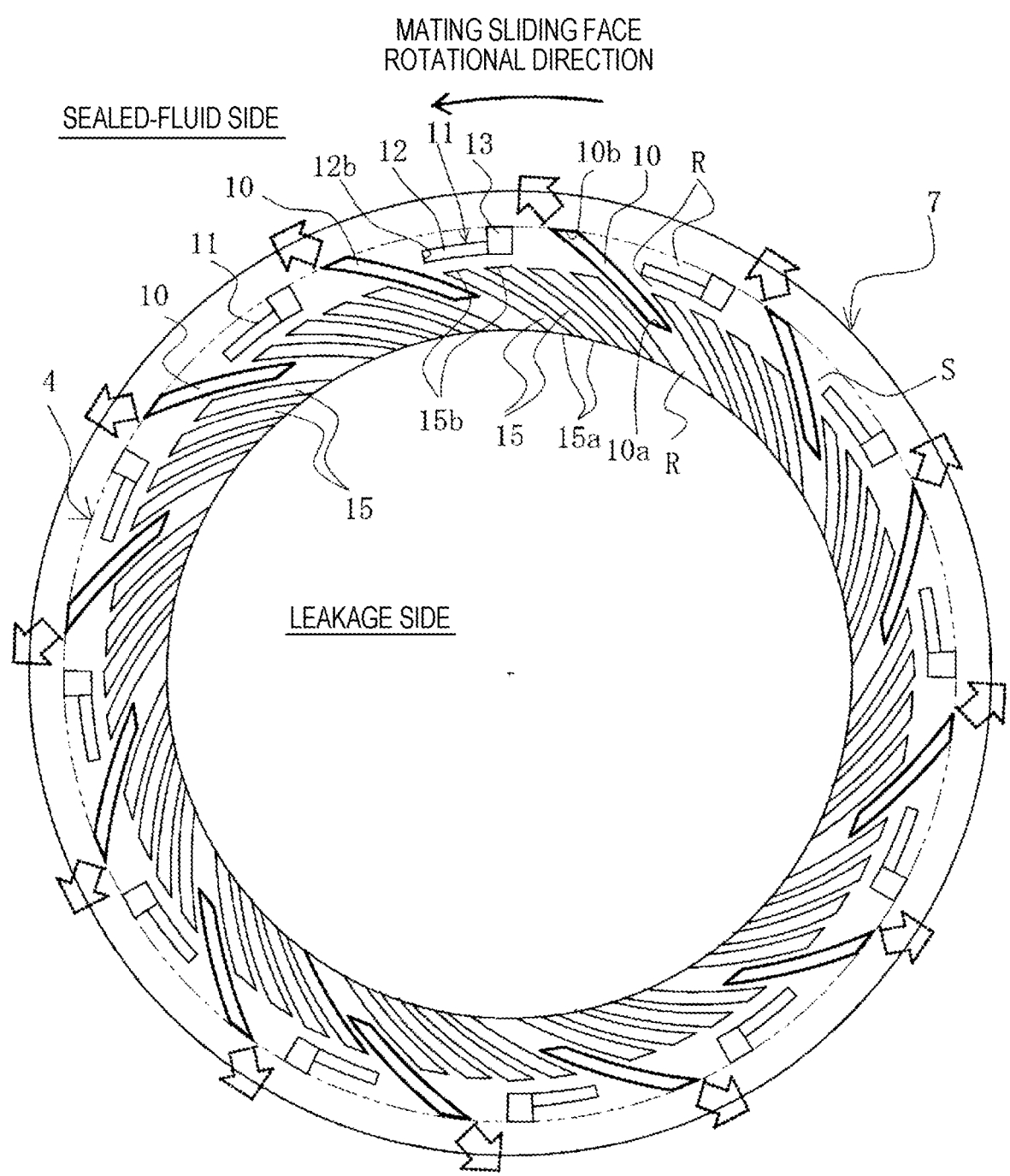
FIG. 5 shows a sliding face of a sliding part according to a fourth embodiment of the present invention, in which a surface texture (positive pressure generation mechanisms, discharge grooves, and pumping grooves) is provided on a sliding face of a stationary-side seal ring.

With reference to FIG. 5, a sliding part according to a fourth embodiment of the present invention will be described.

The sliding part according to the fourth embodiment is different from the sliding part of the first embodiment (FIG. 2) in that the sliding face is provided with spiral grooves in addition to positive pressure generation mechanisms and discharge grooves of the outer peripheral discharge groove type. The other basic configuration thereof is identical to that of the first embodiment, and the same reference numeral is assigned to the same member as that in the first embodiment without duplicated explanation.

In FIG. 5, the sliding face S is provided with spiral grooves 15 in addition to the positive pressure generation mechanisms 11 and the discharge grooves 10 of the outer peripheral discharge groove type. The spiral grooves 15 have upstream ends 15a connected to the leakage side and downstream ends 15b not connected to the circumferential edge on the sealed-fluid side, and are disposed at an angle from upstream to downstream. The spiral grooves 15 are disposed in circumferential spaces between the discharge grooves 10 of the outer peripheral discharge groove type, and are disposed such that inner-peripheral-side portions of the discharge grooves 10 of the outer peripheral discharge groove type overlap outer-peripheral-side portions of the spiral grooves 15. The downstream ends 15b of the spiral grooves 15 extend to the vicinities of the inner sides of the positive pressure generation mechanisms 11.

The spiral grooves 15 have a constant width, extend radially, and are provided at an angle to facilitate the flow of fluid from the upstream ends 15a to the downstream ends 15b by relative sliding. The spiral grooves 15 are not limited to the spiral shape (helical shape), and include those with both side lines connecting the upstream ends 15a and the downstream ends 15b being linear and disposed at an angle like the spiral shape.

In the present example, the spiral grooves 15 are provided in twelve sets of four, circumferentially evenly spaced at appropriate distances. However, the number of the spiral grooves 15 may be one or more, and the spiral grooves 15 are not limited to be evenly spaced.

Note that the groove depth of the discharge grooves 10 of the outer peripheral discharge groove type is deeper than the groove depth of the positive pressure generation grooves 12 and the spiral grooves 15.

From startup to and during a high-speed rotating state of the rotating-side seal ring 4 such as normal operation, the spiral grooves 15 suck gas from the upstream ends 15a, generating dynamic pressure (positive pressure) at or near the downstream ends 15b. Consequently, a slight gap is formed between the sliding faces S of the rotating-side seal ring 4 and the stationary-side seal ring 7, and the sliding faces S are brought into a gas lubrication state from the inner peripheral side to the vicinities of the positive pressure generation mechanisms 11 where the downstream ends 15b are located, having very low friction. At the same time, the gas on the inner peripheral side is pumped toward the outer peripheral side due to the spiral shape, and the liquid on the outer peripheral side can be prevented from leaking to the inner peripheral side. Further, since the spiral grooves 15 are separated from the outer peripheral side by the land R, leakage does not occur during rest.

It has been confirmed by the present inventors that when the positive pressure generation mechanisms 11 and the spiral grooves 15 are arranged as described above, a high pressure value is exhibited at or near the Rayleigh steps 12b of the positive pressure generation mechanisms 11 and outer-peripheral-side ends 15b of the spiral grooves 15. Flows concentrate into portions exhibiting the high pressure value, and foreign matter such as abrasion powder and contaminants also concentrate into the portions.

The discharge grooves 10 of the outer peripheral discharge groove type shown in FIG. 5 have outer-peripheral-side ends 10a communicating with the circumferential edge on the sealed-fluid side and inner-peripheral-side ends 10a not communicating with the circumferential edge on the leakage side, extend to the inner peripheral side beyond the portions exhibiting the high pressure value on the sliding face, and thus can discharge foreign matter such as abrasion powder and contaminants present in a concentrative manner from the inside of the sliding faces to the outer peripheral side.

Fifth Embodiment

Figure 6:
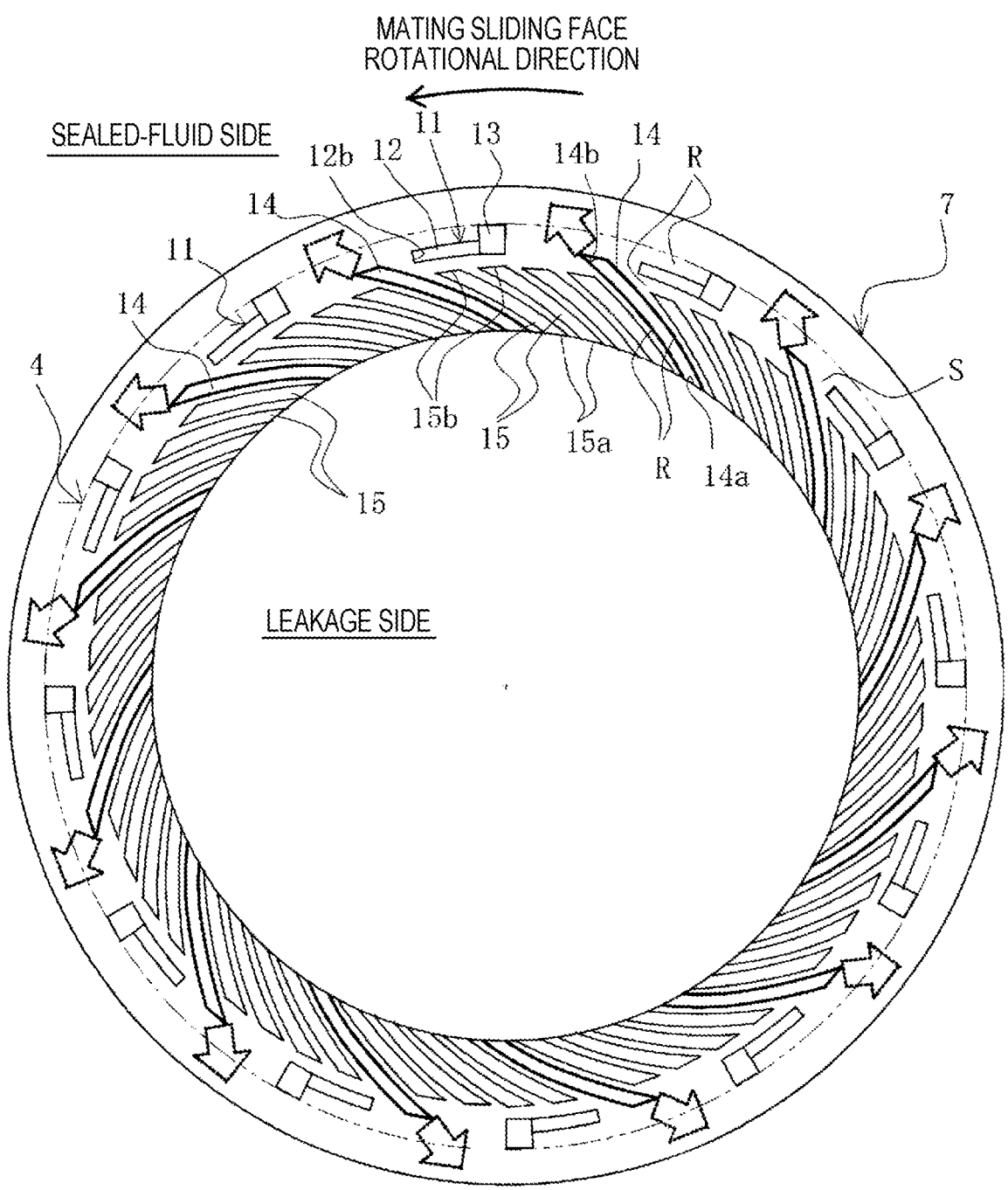
FIG. 6 shows a sliding face of a sliding part according to a fifth embodiment of the present invention, in which a surface texture (positive pressure generation mechanisms, discharge grooves, and pumping grooves) is provided on a sliding face of a stationary-side seal ring.

With reference to FIG. 6, a sliding part according to a fifth embodiment of the present invention will be described.

The sliding part according to the fifth embodiment is different from the sliding part of the second embodiment (FIG. 3) in that the sliding face is provided with spiral grooves in addition to positive pressure generation mechanisms and discharge grooves of the inner peripheral discharge groove type. The other basic configuration thereof is identical to that of the second embodiment, and the same reference numeral is assigned to the same member as that in the second embodiment without duplicated explanation.

In FIG. 6, the sliding face S is provided with spiral grooves 15 having a positive pressure generation function in addition to the positive pressure generation mechanisms 11 and the discharge grooves 14 of the inner peripheral discharge groove type. The spiral grooves 15 have upstream ends 15a connected to the leakage side and downstream ends 15b not connected to the circumferential edge on the sealed-fluid side, and are disposed at an angle from upstream to downstream. The spiral grooves 15 are disposed in circumferential spaces between the discharge grooves 14 of the inner peripheral discharge groove type, and are disposed to overlap portions of the discharge grooves 14 of the inner peripheral discharge groove type on the inner peripheral side of their distal end portions. The downstream ends 15b of the spiral grooves 15 extend to the radially inner peripheral side of the positive pressure generation mechanisms 11.

Note that the downstream ends 14b of the discharge grooves 14 of the inner peripheral discharge groove type extend toward the outer peripheral side beyond the downstream ends 15b of the spiral grooves 15.

The spiral grooves 15 have a constant width, extend radially, and are provided at an angle to facilitate the flow of fluid from the upstream ends 15a to the downstream ends 15b by relative sliding. The spiral grooves 15 are not limited to have the spiral shape, and may be of a rectangular shape, for example.

In the present example, the spiral grooves 15 are provided in twelve sets of four, circumferentially evenly spaced at appropriate distances. However, the number of the spiral grooves 15 may be one or more, and the spiral grooves 15 are not limited to be evenly spaced.

Note that the groove depth of the discharge grooves 14 of the inner peripheral discharge groove type is deeper than the groove depth of the positive pressure generation grooves 12 and the spiral grooves 15.

From startup to and during a high-speed rotating state of the rotating-side seal ring 4 such as normal operation, the spiral grooves 15 suck gas from inner-peripheral-side inlets 15a, generating dynamic pressure (positive pressure) at or near outer-peripheral-side ends 15b. Consequently, a slight gap is formed between the sliding faces S of the rotating-side seal ring 4 and the stationary-side seal ring 7, and the sliding faces S are brought into a gas lubrication state from the inner peripheral side to the vicinities of the outer-peripheral-side ends 15b, having very low friction. At the same time, the gas on the inner peripheral side is pumped toward the outer peripheral side due to the spiral shape, and the liquid on the outer peripheral side is prevented from leaking to the inner peripheral side. Further, since the spiral grooves 15 are separated from the outer peripheral side by the land R, leakage does not occur during rest.

It has been confirmed by the present inventors that when the positive pressure generation mechanisms 11 and the spiral grooves 15 are arranged as described above, a high pressure value is exhibited at or near the Rayleigh steps 12b of the positive pressure generation mechanisms 11 and the outer-peripheral-side ends 15b of the spiral grooves 15. Flows concentrate into portions exhibiting the high pressure value, and foreign matter such as abrasion powder and contaminants also concentrate into the portions.

The discharge grooves 14 of the inner outer peripheral discharge groove type shown in FIG. 6 have the upstream ends 14a connected to the leakage side and the downstream ends 14b not connected to the sealed-fluid side, extend toward the outer peripheral side beyond the portions exhibiting the high pressure value on the sliding face, and thus can actively pump fluid on the leakage side into the sliding faces S, accelerating the flow of the fluid from the inner periphery to the sliding faces S, and can discharge foreign matter such as abrasion powder and contaminants present in a concentrative manner from the inside of the sliding faces to the outer peripheral side.

Sixth Embodiment

Figure 7:
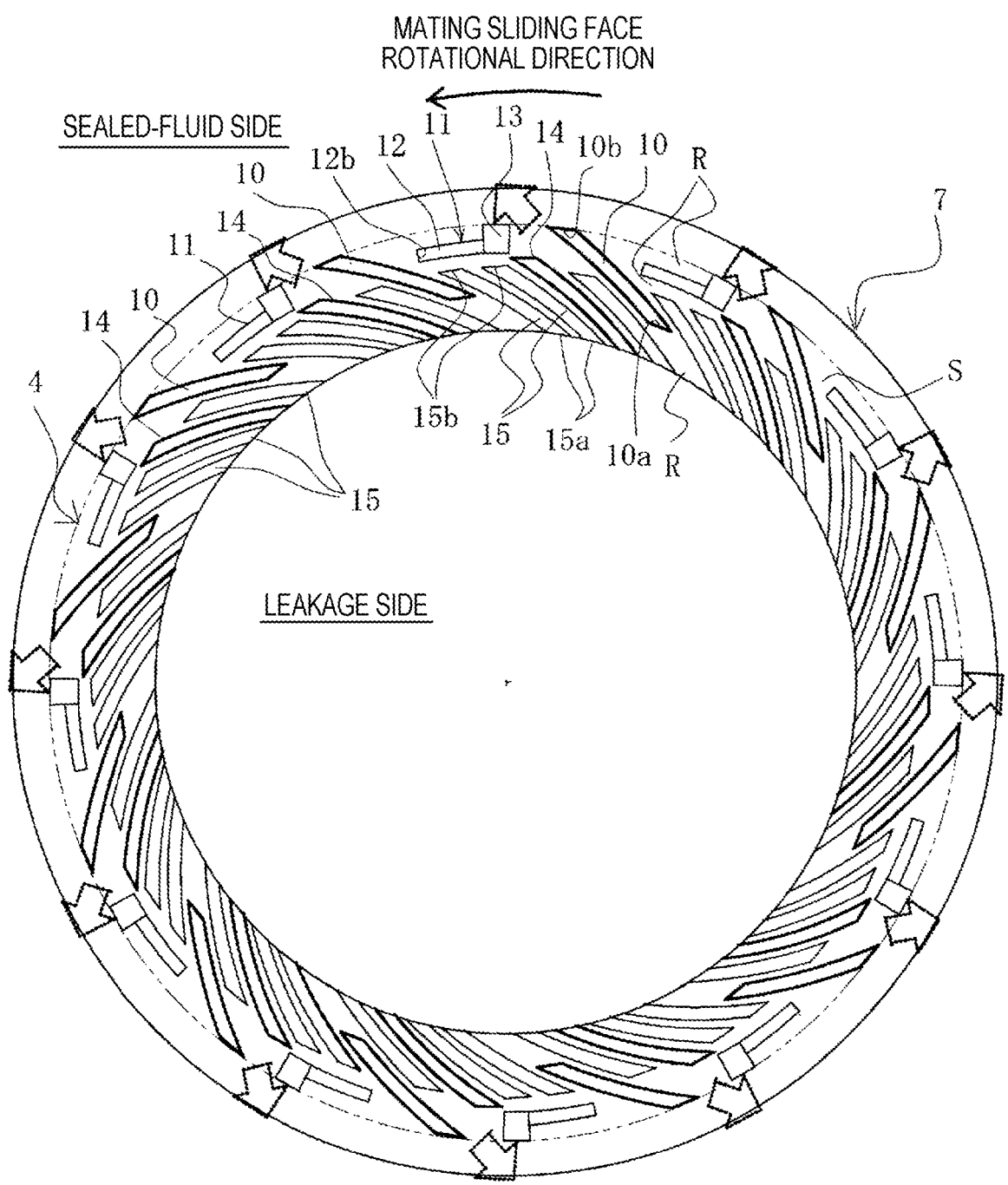
FIG. 7 shows a sliding face of a sliding part according to a sixth embodiment of the present invention, in which a surface texture (positive pressure generation mechanisms, discharge grooves, and pumping grooves) is provided on a sliding face of a stationary-side seal ring.

With reference to FIG. 7, a sliding part according to a sixth embodiment of the present invention will be described.

The sliding part according to the sixth embodiment is different from the sliding part of the third embodiment (FIG. 4) in that the sliding face is provided with spiral grooves in addition to positive pressure generation mechanisms, discharge grooves of the outer peripheral discharge groove type, and discharge grooves of the inner peripheral discharge groove type. The other basic configuration thereof is identical to that of the third embodiment, and the same reference numeral is assigned to the same member as that in the third embodiment without duplicated explanation.

In FIG. 7, the sliding face S is provided with spiral grooves 15 having a positive pressure generation function in addition to the positive pressure generation mechanisms 11, the discharge grooves 10 of the outer peripheral discharge groove type, and the discharge grooves 14 of the inner peripheral discharge groove type. The spiral grooves 15 have upstream ends 15a connected to the leakage side and downstream ends 15b not connected to the circumferential edge on the sealed-fluid side, and are disposed at an angle from upstream to downstream. The spiral grooves 15 are disposed between the discharge grooves 10 of the outer peripheral discharge groove type and the discharge grooves 14 of the inner peripheral discharge groove type, and are disposed such that inner-peripheral-side portions of the discharge grooves 10 of the outer peripheral discharge groove type overlap outer-peripheral-side portions of the spiral grooves 15, and the spiral grooves 15 overlap portions of the discharge grooves 14 of the inner peripheral discharge groove type on the inner-peripheral side of their distal end portions. The downstream ends 15b of the spiral grooves 15 extend to the radially inner peripheral side of the positive pressure generation mechanisms 11.

The spiral grooves 15 have a constant width, extend radially, and are provided at an angle to facilitate the flow of fluid from the upstream ends 15a to the downstream ends 15b by relative sliding. The spiral grooves 15 are not limited to have the spiral shape, and may be of a rectangular shape, for example.

In the present example, the spiral grooves 15 are provided in twelve sets of three, circumferentially evenly spaced at appropriate distances. However, the number of the spiral grooves 15 may be one or more, and the spiral grooves 15 are not limited to be evenly spaced.

Note that the groove depth of the discharge grooves 10 of the outer peripheral discharge groove type and the discharge grooves 14 of the inner peripheral discharge groove type is deeper than the groove depth of the positive pressure generation grooves 12 and the spiral grooves 15.

From startup to and during a high-speed rotating state of the rotating-side seal ring 4 such as normal operation, the spiral grooves 15 suck gas from inner-peripheral-side inlets 15a, generating dynamic pressure (positive pressure) at or near outer-peripheral-side ends 15b. Consequently, a slight gap is formed between the sliding faces S of the rotating-side seal ring 4 and the stationary-side seal ring 7, and the sliding faces S are brought into a gas lubrication state from the inner peripheral side to the vicinities of the outer-peripheral-side ends 15b, having very low friction. At the same time, the gas on the inner peripheral side is pumped toward the outer peripheral side due to the spiral shape, and the liquid on the outer peripheral side is prevented from leaking to the inner peripheral side. Further, since the spiral grooves 15 are separated from the outer peripheral side by the land R, leakage does not occur during rest.

It has been confirmed by the present inventors that when the positive pressure generation mechanisms 11 and the spiral grooves 15 are arranged as described above, a high pressure value is exhibited at or near the Rayleigh steps 12b of the positive pressure generation mechanisms 11 and the outer-peripheral-side ends 15b of the spiral grooves 15. Flows concentrate into portions exhibiting the high pressure value, and foreign matter such as abrasion powder and contaminants also concentrate into the portions.

The discharge grooves 10 of the outer peripheral discharge groove type shown in FIG. 7 have the outer-peripheral-side ends 10a communicating with the circumferential edge on the sealed-fluid side and the inner-peripheral-side ends 10a not communicating with the circumferential edge on the leakage side, and extend toward the inner peripheral side beyond the portions exhibiting the high pressure value on the sliding face, and the discharge grooves 14 of the inner outer peripheral discharge groove type have the upstream ends 14a connected to the leakage side and the downstream ends 14b not connected to the sealed-fluid side, and extend toward the outer peripheral side beyond the portions exhibiting the high pressure value on the sliding face, so that the discharge grooves 14 of the inner outer peripheral discharge groove type actively pump fluid on the leakage side into the sliding faces S, and the discharge grooves 10 of the outer peripheral discharge groove type discharge fluid to the outer peripheral side, accelerating the flow of the fluid from the inner periphery to the outer periphery, and can discharge foreign matter such as abrasion powder and contaminants present in a concentrative manner from the inside of the sliding faces to the outer peripheral side.

The embodiments of the present invention have been described above with reference to the drawings, its specific configuration is not limited to the embodiments, and any changes and additions without departing from the scope of the present invention are included in the present invention.

For example, although the above embodiments have described an example where a sliding part is used as one of a pair of rotating seal ring and a stationary seal ring in a mechanical seal device, the sliding part can be used as a bearing sliding part that slides on a rotating shaft while sealing lubricating oil on one axial side of a cylindrical sliding face.

Further, for example, although the above embodiments have described the outer peripheral side of the sliding parts as the sealed-fluid side (liquid side or misty-fluid side), and the inner peripheral side as the leakage side (gas side), the present invention is not limited to this, and is also applicable to a case where the outer peripheral side is the leakage side (gas side), and the inner peripheral side is the sealed-fluid side (liquid side or misty-fluid side). As for the relationship in the magnitude of pressure between the sealed-fluid side (liquid side or misty-fluid side) and the leakage side (gas side), for example, the sealed-fluid side (liquid side or misty-fluid side) may be at high pressure, and the leakage side (gas side) at lower pressure, or vice versa. Alternatively, both sides may be at equal pressure.

Further, for example, the above embodiments have described a case where the positive pressure generation mechanisms 11 are formed from the positive pressure generation grooves 12 communicating with the circumferential edge on the outer peripheral side via the radius-direction deep grooves 13, e.g. grooves of Rayleigh step mechanisms having Rayleigh steps, but the present invention is not limited thereto. The positive pressure generation mechanisms may be formed from spiral grooves. It is essential only that they are mechanisms generating positive pressure.

REFERENCE SIGNS LIST 1 impeller
2 rotating shaft
3 sleeve
4 rotating-side seal ring
5 housing
6 cartridge
7 stationary-side seal ring
8 coiled wave spring
10 discharge groove (outer peripheral discharge groove type)
10a upstream end
10b downstream end
11 positive pressure generation mechanism (Rayleigh step mechanism)
12 positive pressure generation groove (groove having Rayleigh step)
12a upstream end
12b downstream end
13 radius-direction deep groove
14 discharge groove (inner peripheral discharge groove type)
14a upstream end
14b downstream end
15 spiral groove
15a upstream end
15b downstream end
S sliding face
R land

The invention claimed is:

1. A sliding component comprising a pair of sliding parts sliding relatively to each other, one of the sliding parts being a stationary-side seal ring, the other of the sliding parts being a rotating-side seal ring, the seal rings having sliding faces formed radially for sealing a liquid or a misty fluid as a sealed fluid against leakage, characterized in that at least one of the sliding faces is provided with:
  positive pressure generation mechanisms having positive pressure generation grooves configured to communicate with a circumferential edge of the sliding face on a sealed-fluid side and not to communicate with a circumferential edge on a leakage side, each positive pressure generation mechanism being constituted by:
    a radius-direction deep groove communicating with the circumferential edge on the sealed-fluid side, and
    each positive pressure generation groove having one end communicating with the radius-direction deep groove and another end having a Rayleigh step, and
  discharge grooves disposed, without communicating with the positive pressure generation grooves, at an angle with reference to a mating sliding face rotational direction as viewed in a direction of a rotational axis, said mating sliding face rotational direction being a rotational direction of a mating sliding face of the pair of sliding parts rotating relatively to the sliding face, wherein each discharge groove has an upstream end and a downstream end with respect to the mating sliding face rotational direction such that the upstream end of each discharge groove is located on the leakage side of the sliding face, and the downstream end of each discharge groove is located on the sealed-fluid edge side of the sliding face, wherein each discharge groove is an outer peripheral discharge groove type wherein, among the upstream end and the downstream end of each discharge groove,
    a first end located on a radially inner circumferential edge side of the sliding face communicates neither with a radially outer circumferential edge nor with the radially inner circumferential edge of the sliding face, and
    a second end located on the radially outer circumferential edge side of the sliding face communicates with the radially outer circumferential edge.

2. The sliding component according to claim 1, characterized in that the circumferential edge of the sliding face on the sealed-fluid side is the radially outer circumferential edge, and the circumferential edge of the sliding face on the leakage side is the radially inner circumferential edge.

3. The sliding component according to claim 2, characterized in that the sliding face is provided with spiral grooves, each having:
an upstream end, with respect to the mating sliding face rotational direction, which communicates with the radially inner circumferential edge, and
a downstream end, with respect to the mating sliding face rotational direction, which communicates neither with the radially inner circumferential edge nor with the radially outer circumferential edge,
wherein each spiral groove has a depth shallower than a depth of each discharge groove, and is disposed at an angle from upstream to downstream with reference to the mating sliding face rotational direction as viewed in a direction of a rotational axis.

4. The sliding component according to claim 1, characterized in that the circumferential edge of the sliding face on the sealed-fluid side is the radially outer circumferential edge, and the circumferential edge of the sliding face on the leakage side is the radially inner circumferential edge, and
the at least one of the sliding faces is provided further with other discharge grooves, each discharge groove being an inner peripheral discharge groove type wherein:
the upstream end of each discharge groove communicates with the radially inner circumferential edge, and
the downstream end of each discharge groove communicates neither with the radially inner circumferential edge nor with the radially outer circumferential edge.

5. The sliding component according to claim 4, characterized in that the sliding face is provided further with spiral grooves, each having:
an upstream end, with respect to the mating sliding face rotational direction, which communicates with the radially inner circumferential edge of the sliding face, and
a downstream end, with respect to the mating sliding face rotational direction, which communicates neither with the radially inner circumferential edge nor with the radially outer circumferential edge,
wherein each spiral groove has a depth shallower than a depth of each discharge groove, and is disposed at an angle from upstream to downstream with reference to the mating sliding face rotational direction as viewed in a direction of a rotational axis.

6. The sliding component according to claim 1, characterized in that the circumferential edge of the sliding face on the sealed-fluid side is the radially outer circumferential edge, and the circumferential edge of the sliding face on the leakage side is the radially inner circumferential edge, and
the sliding face is provided further with spiral grooves, each having:
an upstream end, with respect to the mating sliding face rotational direction, which communicates with the radially inner circumferential edge, and
a downstream end, with respect to the mating sliding face rotational direction, which communicates neither with the radially inner circumferential edge nor with the radially outer circumferential edge,
wherein each spiral groove has a depth shallower than a depth of each discharge groove, and is disposed at an angle from upstream to downstream with reference to the mating sliding face rotational direction as viewed in a direction of a rotational axis.

7. The sliding component according to claim 6, characterized in that the discharge grooves have a groove depth deeper than the positive pressure generation grooves.

8. The sliding component according to claim 1, characterized in that each positive pressure generation groove has, as the Rayleigh step, a downstream width or depth, with respect to the mating sliding face rotational direction, set smaller than an upstream width or depth of the positive pressure generation groove.

9. The sliding component according to claim 1, characterized in that the sliding face has a land provided with dimples.

10. The sliding component according to claim 1, characterized in that the sliding face is provided further with spiral grooves, each having:
an upstream end, with respect to the mating sliding face rotational direction, which communicates with the radially inner circumferential edge of the sliding face, and
a downstream end, with respect to the mating sliding face rotational direction, which communicates neither with the radially inner circumferential edge nor with the radially outer circumferential edge,
wherein each spiral groove has a depth shallower than a depth of each discharge groove, and is disposed at an angle from upstream to downstream with reference to the mating sliding face rotational direction as viewed in a direction of a rotational axis.

11. The sliding component according to claim 1, characterized in that the circumferential edge of the sliding face on the sealed-fluid side is the radially inner circumferential edge, and the circumferential edge on the leakage side is the radially outer circumferential edge, and
the at least one of the sliding faces is provided further with other discharge grooves, each discharge groove being an inner peripheral discharge groove type wherein:
the upstream end of each discharge groove communicates neither with the radially inner circumferential edge nor with the radially outer circumferential edge, and
the downstream end of each discharge groove communicates with the radially inner circumferential edge.

12. The sliding component according to claim 11, characterized in that the sliding face is provided further with spiral grooves, each having:
an upstream end, with respect to the mating sliding face rotational direction, which communicates with the radially outer circumferential edge, and
a downstream end, with respect to the mating sliding face rotational direction, which communicates neither with the radially inner circumferential edge nor with the radially outer circumferential edge,
wherein each spiral groove has a depth shallower than a depth of each discharge groove, and is disposed at an angle from upstream to downstream with reference to the mating sliding face rotational direction as viewed in a direction of a rotational axis.

13. The sliding component according to claim 1, characterized in that the circumferential edge of the sliding face on the sealed-fluid side is the radially inner circumferential edge, and the circumferential edge on the leakage side is the radially outer circumferential edge.

14. The sliding component according to claim 13, characterized in that the sliding face is provided further with spiral grooves, each having:
an upstream end, with respect to the mating sliding face rotational direction, which communicates with the radially outer circumferential edge, and
a downstream end, with respect to the mating sliding face rotational direction, which communicates neither with the radially inner circumferential edge nor with the radially outer circumferential edge,
wherein each spiral groove has a depth shallower than a depth of each discharge groove, and is disposed at an angle from upstream to downstream with reference to the mating sliding face rotational direction as viewed in a direction of a rotational axis.

* * * * *